US012777180B2

(12) United States Patent
Chen et al.

(10) Patent No.: US 12,777,180 B2
(45) Date of Patent: Oct. 27, 2026

(54) CHAIN-BASED MOTION VECTOR AND CHAIN-BASED MOTION VECTOR PREDICTOR DERIVATION

(71) Applicant: Tencent America LLC, Palo Alto, CA (US)

(72) Inventors: Lien-Fei Chen, Palo Alto, CA (US); Biao Wang, San Jose, CA (US); Tianqi Liu, Palo Alto, CA (US); Roman Chernyak, Santa Clara, CA (US); Motong Xu, Palo Alto, CA (US); Yifan Wang, Palo Alto, CA (US); Ziyue Xiang, Palo Alto, CA (US); Shan Liu, San Jose, CA (US); Yonguk Yoon, Palo Alto, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 19/182,500

(22) Filed: Apr. 17, 2025

(65) Prior Publication Data

US 2025/0330633 A1 Oct. 23, 2025

Related U.S. Application Data

(60) Provisional application No. 63/636,556, filed on Apr. 19, 2024.

(51) Int. Cl.
*H04N 19/00* (2014.01)
*H04N 19/139* (2014.01)
(Continued)

(52) U.S. Cl.
CPC ........... *H04N 19/52* (2014.11); *H04N 19/139* (2014.11); *H04N 19/159* (2014.11); *H04N 19/176* (2014.11)

(58) Field of Classification Search
None
See application file for complete search history.

(56) References Cited

U.S. PATENT DOCUMENTS

2011/0057933 A1* 3/2011 Lyashevsky ......... H04N 19/521 345/428
2011/0293012 A1* 12/2011 Au ....................... H04N 19/433 375/E7.125
(Continued)

OTHER PUBLICATIONS

Yoshitaka Kidani et al., "Non-EE2: Chained motion vector prediction", Joint Video Exploration Team (JVET) of ITU-T SG 16 WP 3 and ISO/IEC JTC 1/SC 29/WG, 33rd Meeting by teleconference, Jan. 17-26, 2024, Document: JVET-AG0073-v3, pp. 1-5.

*Primary Examiner* — Zhihan Zhou
(74) *Attorney, Agent, or Firm* — ArentFox Schiff LLP

(57) ABSTRACT

A method for video decoding includes receiving coded information of a current block indicating inter prediction for the current block. Whether a current intermediate vector pointing to a first block in a first reference picture from a second block in a second reference picture is valid for deriving one of a chain-based MV and a chain-based MVP for the current block is determined based on one or more of reference picture information of the first reference picture, reference picture information of the current block, a position of the first block, and history information associated with at least one previously derived intermediate vector that is associated with the current block and the second block. When the current intermediate vector is valid, the one of the chain-based MV and the chain-based MVP is determined based on the current intermediate vector and the at least one previously derived intermediate vector.

20 Claims, 10 Drawing Sheets

(51) Int. Cl.

| | |
|---|---|
| ***H04N 19/159*** | (2014.01) |
| ***H04N 19/176*** | (2014.01) |
| ***H04N 19/52*** | (2014.01) |

(56) References Cited

U.S. PATENT DOCUMENTS

| | | | | |
|---|---|---|---|---|
| 2018/0184107 | A1* | 6/2018 | Hu | H04N 19/56 |
| 2018/0255318 | A1* | 9/2018 | Xu | H04N 19/521 |
| 2023/0007272 | A1* | 1/2023 | Tourapis | H04N 19/109 |
| 2025/0301149 | A1* | 9/2025 | Lin | H04N 19/105 |

* cited by examiner

CHAIN-BASED MOTION VECTOR AND CHAIN-BASED MOTION VECTOR PREDICTOR DERIVATION

RELATED APPLICATION

The present application claims the benefit of priority to U.S. Provisional Application No. 63/636,556 filed on Apr. 19, 2024, which is incorporated by reference herein in its entirety.

TECHNICAL FIELD

The present disclosure describes aspects generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression may help transmit image/video data across different devices, storage and networks with minimal quality degradation. In some examples, video codec technology may compress video based on spatial and temporal redundancy. In an example, a video codec may use techniques referred to as intra prediction that may compress an image based on spatial redundancy. For example, the intra prediction may use reference data from the current picture under reconstruction for sample prediction. In another example, a video codec may use techniques referred to as inter prediction that may compress an image based on temporal redundancy. For example, the inter prediction may predict samples in a current picture from a previously reconstructed picture with motion compensation. The motion compensation may be indicated by a motion vector (MV).

SUMMARY

Aspects of the disclosure include methods and apparatuses for video encoding/decoding.

Aspects of the disclosure provide a method for video decoding in which a video bitstream including coded information of a current block in a current picture indicating that the current block is decoded using inter prediction is received. Whether a current intermediate vector pointing to a first block in a first reference picture from a second block in a second reference picture is valid for use in deriving one of a chain-based motion vector (MV) and a chain-based motion vector predictor (MVP) for the current block is determined based on one or more of (i) first reference picture information of the first reference picture, (ii) current reference picture information of the current block, (iii) a position of the first block, and (iv) history information associated with at least one previously derived intermediate vector that is associated with the current block in the current picture and the second block in the second reference picture. When the current intermediate vector is determined to be valid, the one of the chain-based MV and the chain-based MVP for the current block is determined based on the current intermediate vector and the at least one previously derived intermediate vector and the current block is reconstructed based on the one of the chain-based MV and the chain-based MVP.

Aspects of the disclosure also provide an apparatus for video decoding. The apparatus for video decoding includes processing circuitry configured to implement any of the described methods for video decoding.

Aspects of the disclosure also provide a method for video encoding in which whether a current intermediate vector pointing to a first block in a first reference picture from a second block in a second reference picture is valid for use in deriving one of a chain-based motion vector (MV) and a chain-based motion vector predictor (MVP) for a current block in a current picture is determined based on one or more of (i) first reference picture information of the first reference picture, (ii) current reference picture information of the current block, (iii) a position of the first block, and (iv) history information associated with at least one previously derived intermediate vector that is associated with the current block in the current picture and the second block in the second reference picture. When the current intermediate vector is determined to be valid, the one of the chain-based MV and the chain-based MVP for the current block is determined based on the current intermediate vector and the at least one previously derived intermediate vector, the current block is encoded based on the one of the chain-based MV and the chain-based MVP using inter prediction, and coded information of the current block indicating that the current block is encoded using the inter prediction is encoded in a video bitstream.

Aspects of the disclosure also provide an apparatus for video encoding. The apparatus for video encoding includes processing circuitry configured to implement any of the described methods for video encoding.

Aspects of the disclosure also provide a non-transitory computer-readable medium storing instructions which, when executed by a computer, cause the computer to perform any of the described methods for video decoding/encoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
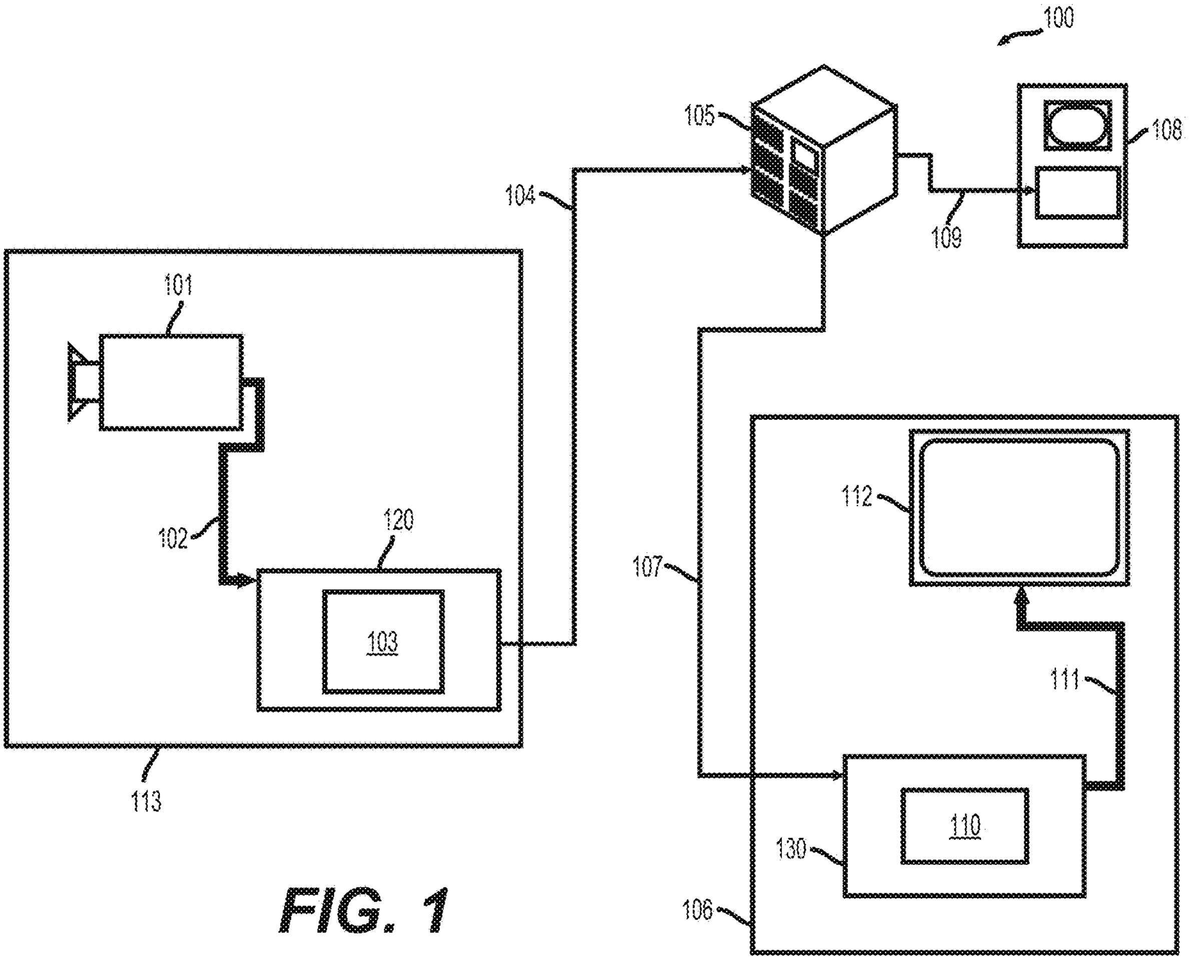
FIG. 1 is a schematic illustration of an example of a block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter may be equally applicable to other video enabled applications, including, for example, video conferencing, digital TV, streaming services, storing of compressed video on digital media including CD, DVD, memory stick and the like, and so on.

The video processing system (100) includes a capture subsystem (113), that may include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), may be processed by an electronic device (120) that includes a video encoder (103) coupled to the video source (101). The video encoder (103) may include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), may be stored on a streaming server (105) for future use. One or more streaming client subsystems, such as client subsystems (106) and (108) in FIG. 1 may access the streaming server (105) to retrieve copies (107) and (109) of the encoded video data (104). A client subsystem (106) may include a video decoder (110), for example, in an electronic device (130). The video decoder (110) decodes the incoming copy (107) of the encoded video data and creates an outgoing stream of video pictures (111) that may be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
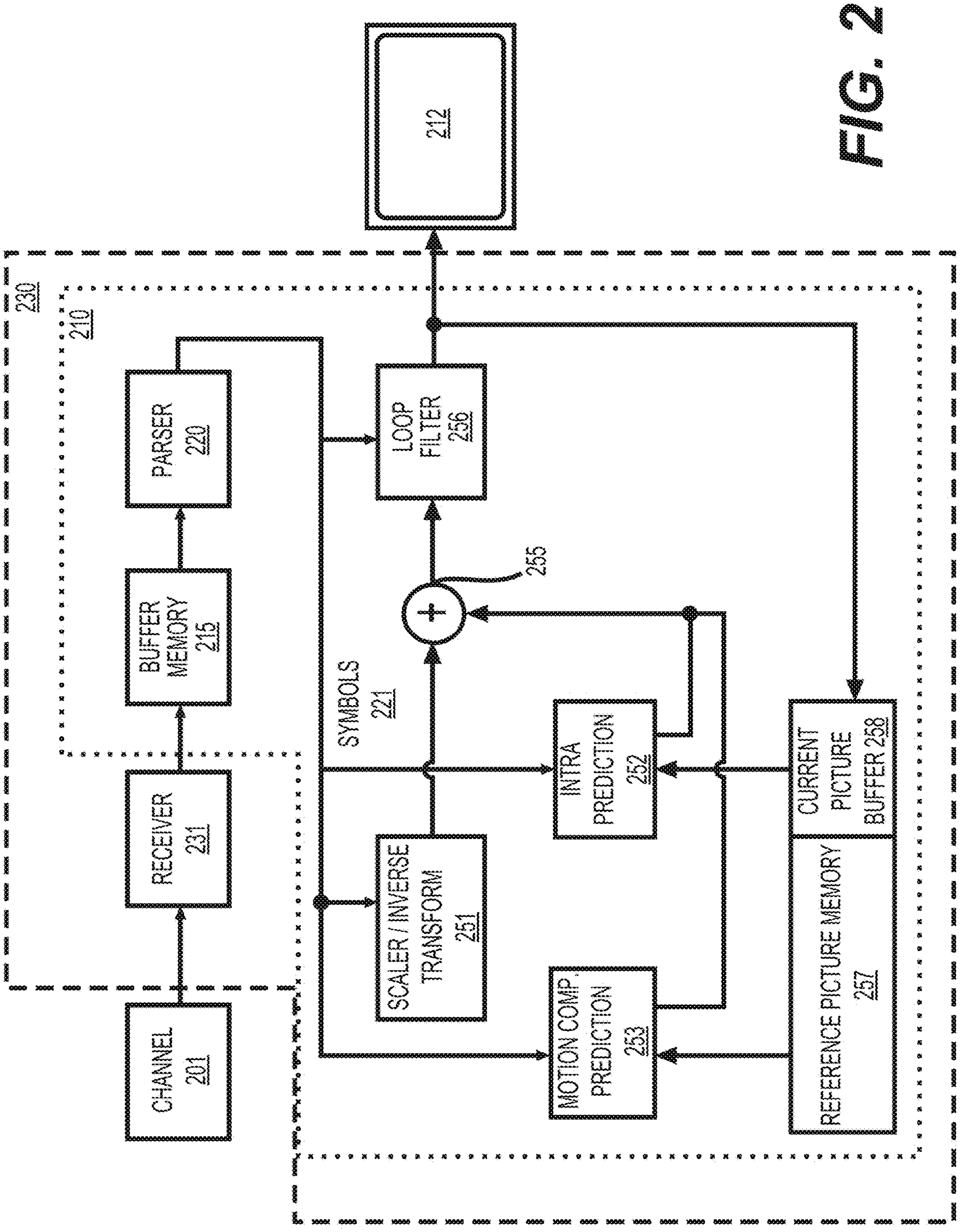
FIG. 2 is a schematic illustration of an example of a block diagram of a decoder.

FIG. 2 shows an example of a block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences, included in a bitstream for example, to be decoded by the video decoder (210). In an aspect, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an aspect, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
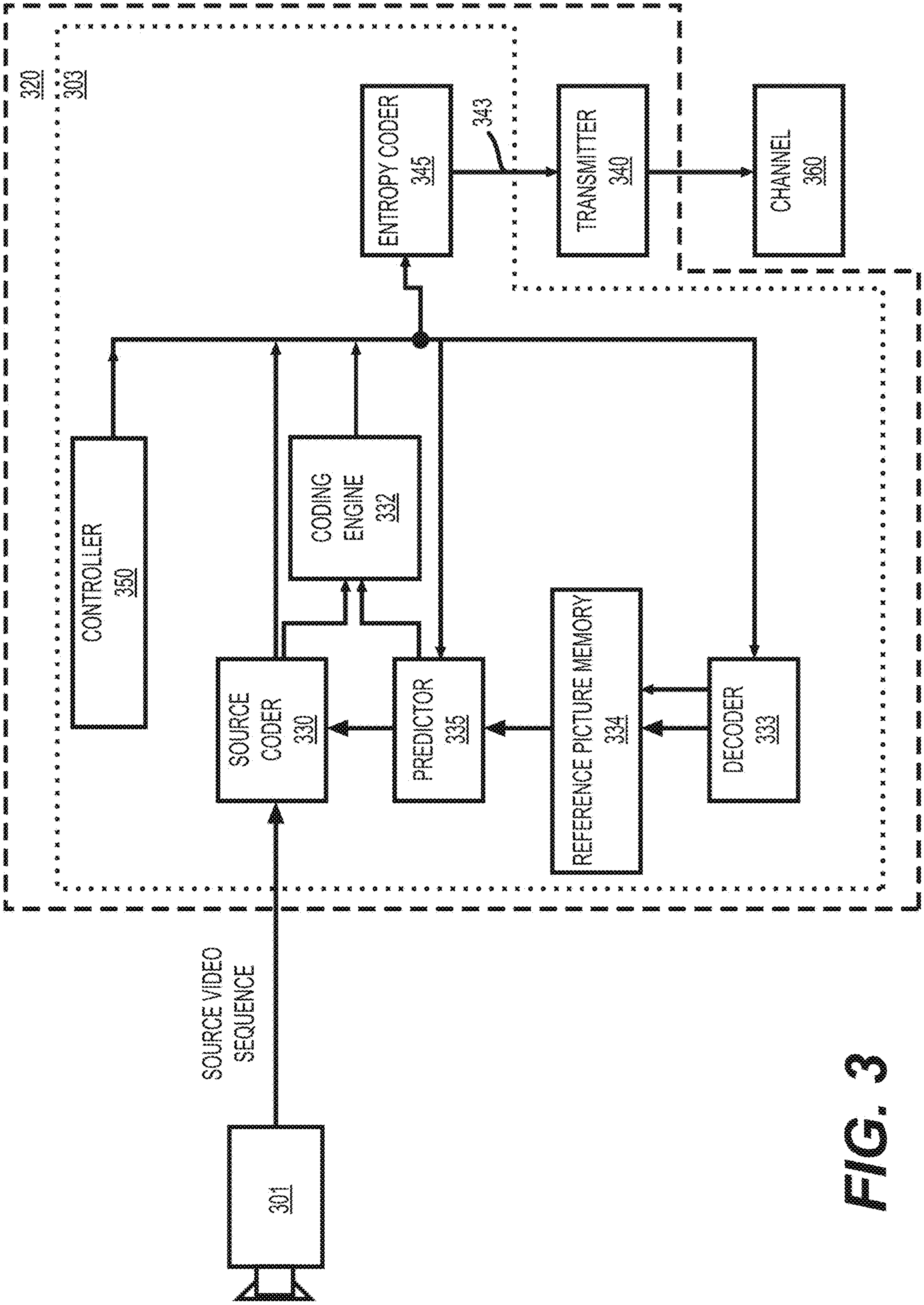
FIG. 3 is a schematic illustration of an example of a block diagram of an encoder.

FIG. 3 shows an example of a block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can include one or more samples depending on the sampling structure, color space, etc. in use. The description below focuses on samples.

According to an aspect, the video encoder (303) may code and compress the pictures of the source video sequence into a coded video sequence (343) in real time or under any other time constraints as required. Enforcing appropriate coding speed is one function of a controller (350). In some aspects, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some aspects, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an aspect, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an aspect, the transmitter (340) may transmit additional data with the encoded video. The source coder (330) may include such data as part of the coded video sequence. Additional data may include temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes use of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some aspects, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some aspects of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×6 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an aspect, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an aspect, the video encoders (103) and (303) and the video decoders (110) and (210) can be implemented using one or more integrated circuits. In another aspect, the video encoders (103) and (303), and the video decoders (110) and (210) can be implemented using one or more processors that execute software instructions.

Video coding has been widely used in many applications such as broadcasting, video recording, video streaming, and the like. Various emerging video coding standards such as H.264, H.265/HEVC, H.266/VVC, and AV1 are adopted in the video applications. A hybrid video codec can include coding modules, intra prediction, inter prediction, transform coding, quantization, entropy coding, post in-loop filters, and the like.

In inter prediction coding, a final motion vector (MV) may be determined (e.g., derived) using a merge mode or an advanced MVP (AMVP) mode. In the merge mode, the final MV may be derived based on spatial/temporal information and/or the like. In the AMVP mode, the final MV may be determined as a sum of a motion vector difference (MVD) (e.g., the MVD may be signaled) and a derived or selected motion vector predictor (MVP). The final MV determined in the merge mode may be referred to as a merged MV and may be derived from the motion vector information of spatial adjacent coded block(s), temporal co-located coded block (s), non-adjacent coded block(s), history-based coded block (s), or the like. An MVP candidate determined in the AMVP mode may be generated based on the motion vector from spatial adjacent coded block(s), temporal co-located coded block(s), non-adjacent coded block(s), history-based coded block(s), or the like.

In related technology, a chain-based MV in the merge mode is used to construct a merged MV by using motion vector lookahead/lookbehind techniques. Using the motion vector lookahead/lookbehind techniques, recursively traced MVs may be summed together when the recursive MV(s) may be available. The motion vector lookahead and/or lookbehind techniques may also be utilized to recursively sum up recursively traced MVs to derive a chain-based MVP and a chain-based subblock/affine MV.

Figure 4:
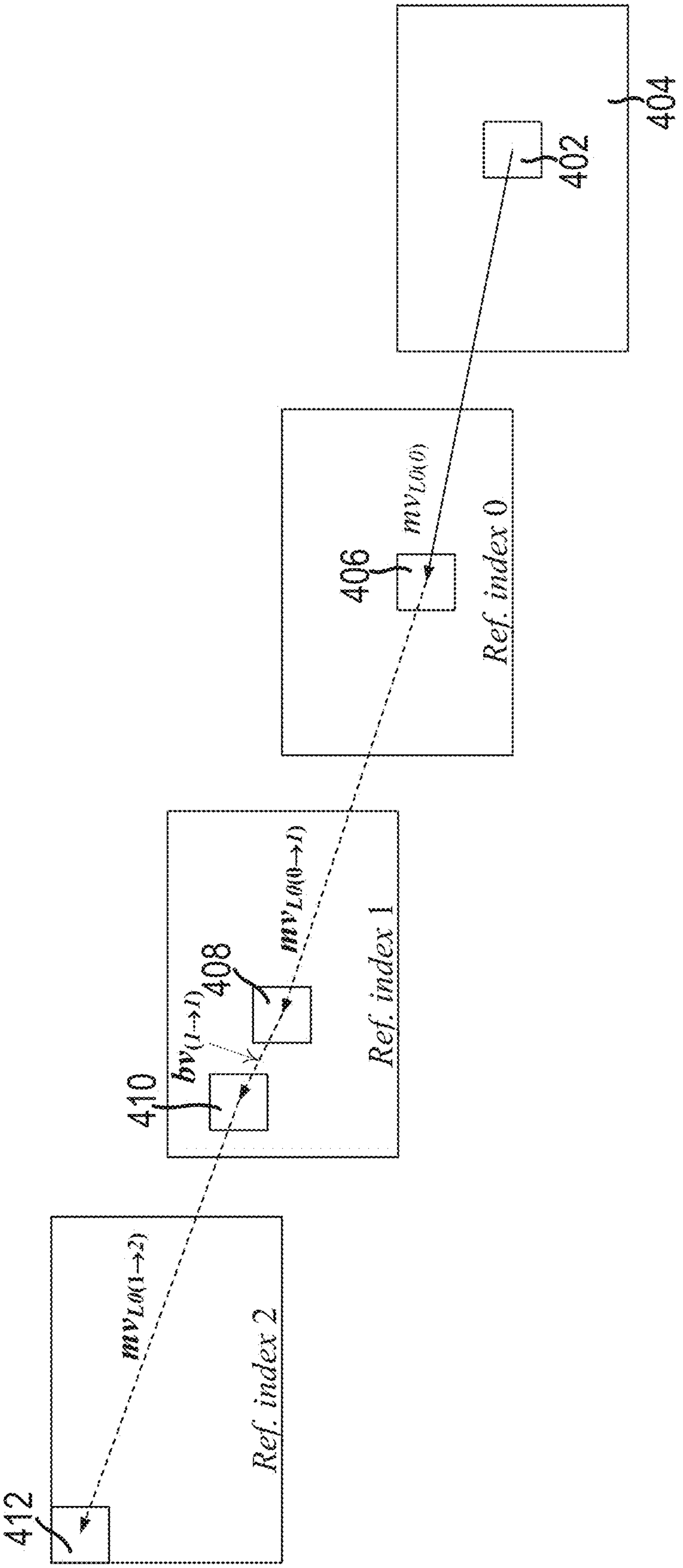
FIG. 4 shows an example of a chained motion vector predictor (MVP) derivation for chain-based MVP construction at a reference picture according to an aspect of the disclosure.

FIG. 4 shows an example of a chained MVP derivation for chain-based MVP construction at a reference picture (e.g., at a reference picture indicated by a reference index 2) in a forward reference list (e.g., a reference list 0 or L0) according to an aspect of the disclosure. FIG. 4 shows an example of the chain-based MVP construction using a lookahead technique in the reference list 0. FIG. 4 is merely an example of a recursive chain-based MVP or chained MVP derivation process for the chain-based MVP construction at the reference index 2 in the reference list 0. The chain-based MVP construction may be conducted using a lookbehind technique in a backward reference list (e.g., a reference list 1 or L1). The descriptions with reference to FIG. 4 may be suitably adapted to describe the derivation of a chained MV (or a chain-based MV) used in the merge mode.

A shown in FIG. 4, a current block (402) is included in a current picture (404). The current picture (404) has a plurality of reference pictures, such as reference pictures identified by reference indices 0-2, in a reference list (e.g., the reference list 0). The reference indices 0-2 may indicate different reference pictures in the reference list. The reference pictures identified by the reference indices 0-2 may be adjacent or non-adjacent. For example, the reference indices 0 and 1 may indicate two adjacent reference pictures or two non-adjacent reference pictures in the reference list.

Referring to FIG. 4, recursive intermediate vectors $mv_{L0(0\rightarrow1)}$, $bv_{(1\rightarrow1)}$, and $mv_{L0(1\rightarrow2)}$ may be used for chained MVP derivation, and point from one node to another node to generate a final chain-based MVP. A node may refer to a block such as (i) an intermediate block (e.g., (406), (408), or (410)) or (ii) a block (412).

An intermediate $mv_{L0(0)}$ of the current block (402) may be derived based on an MVP construction from spatial or temporal information for a non-merge mode (e.g., the AMVP mode). The derived intermediate MV, $mv_{L0(0)}$, may point from the current picture (404) to the reference picture identified by the reference index 0, such as point to the reference block (406) in the reference picture identified by the reference index 0. The derived intermediate MV, $mv_{L0(0)}$, may be considered as an initial vector as $mv_{L0(0)}$ points from the current picture (404).

An intermediate MV $mv_{L0(0\rightarrow1)}$ may be defined from the reference block (406) in the reference index 0 to the reference block (408) in the reference index 1. In some aspects, a block vector (BV) $bv_{(1\rightarrow1)}$ may be defined from the reference block (408) in the reference index 1 to a reference block (410) in the reference index 1. An intermediate MV $mv_{L0(1\rightarrow2)}$ may be defined from the reference block (410) in the reference index 1 to a reference block (412) in the reference index 2.

In an aspect, the final chain-based MVP (or a lookahead MVP) for the reference index 2 may be derived by using a sum of $mv_{L0(0)}$, the recursive intermediate vectors such as the recursive intermediate MVs, $mv_{L0(0\rightarrow1)}$ and $mv_{L0(1\rightarrow2)}$, and the recursive intermediate BV $bv_{(1\rightarrow1)}$. Thus, the derived chain-based MVP for the reference index 2 may be equal to $mv_{L0(0)}+mv_{L0(0\rightarrow1)}+bv_{(1\rightarrow1)}+mvL_{0(1\rightarrow2)}$.

In an aspect, a chain-based MV is used for merge candidate construction used in the merge mode. In an example, the current block (402) is decoded using the merge mode. The current block (402) may be reconstructed based on the chain-based MV (e.g., the chain-based MV$=mv_{L0(0)}+mv_{L0(0\rightarrow1)}+bv_{(1\rightarrow1)}+mv_{L0(1\rightarrow2)}$).

In an aspect, a chain-based MVP may be used in the AMVP mode, and may be combined with an MVD to reconstruct an MV for the current block (402). For example, the current block (402) is coded using the AMVP mode. An MVP candidate list including the chain-based MVP (e.g., the chain-based MVP$=mv_{L0(0)}+mv_{L0(0\rightarrow1)}+bv_{(1\rightarrow1)}+mv_{L0(1\rightarrow2)}$) for the AMVP mode may be constructed for the current block (402). The current block (402) may be reconstructed based on (i) an MVP candidate from the MVP candidate list and (ii) an MVD.

Figure 5:
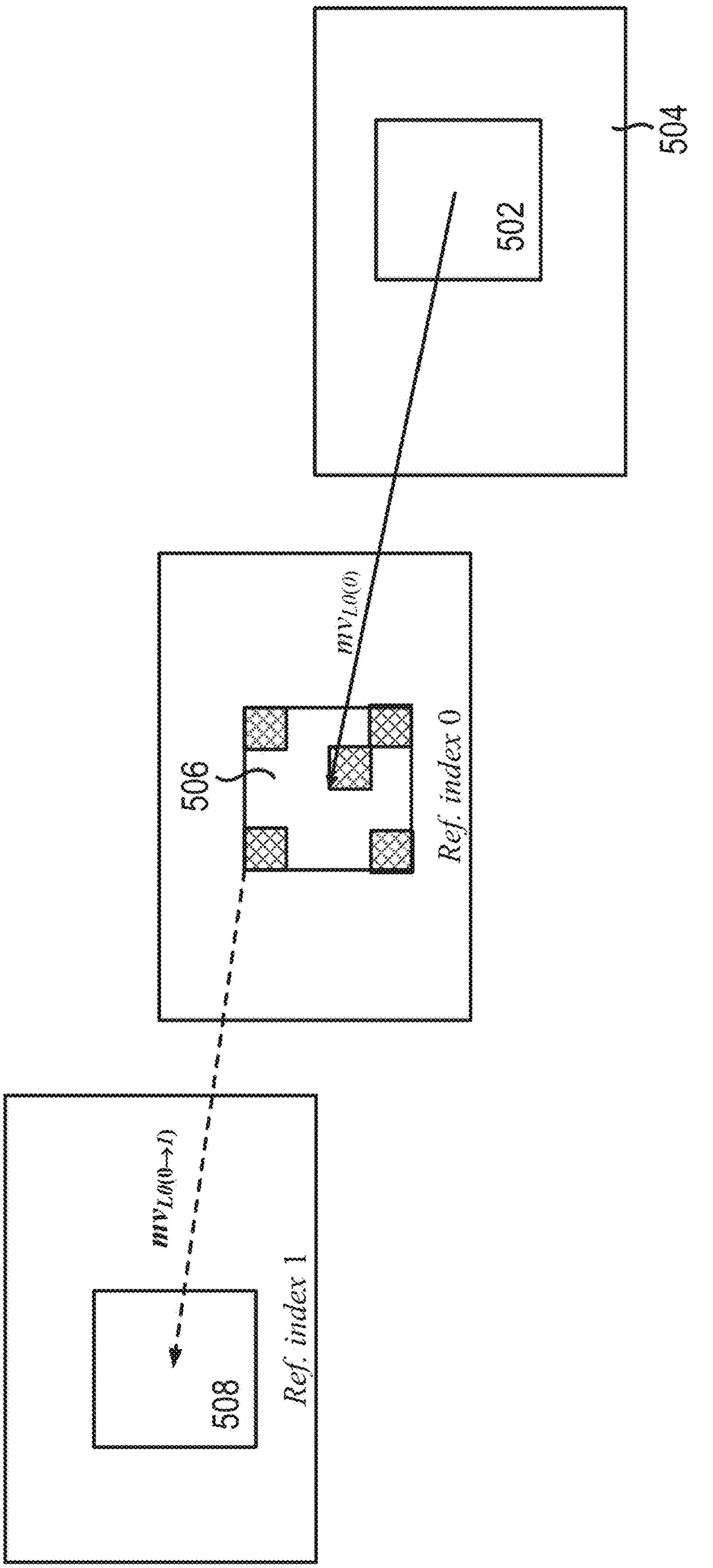
FIG. 5 shows an example of candidate motion field positions according to an aspect of the disclosure.

In an aspect, an intermediate MV from a reference index i to a reference j may be derived by checking availability of an MV in a corresponding motion field. In an aspect, the availability of the motion vector within the motion field is checked by scanning the availability of the motion vector in one or more positions. A scanning order may be a predefined order if multiple positions are checked. FIG. 5 shows an example of candidate motion field positions. As shown in FIG. 5, an intermediate MV $mv_{L0(0\rightarrow1)}$ from the reference index 0 to the reference index 1 is derived based on availability of a motion vector from 5 motion field positions. For example, the 5 motion fields position are defined in a reference block (506) that is indicated by $mv_{L0(0)}$ that points from a current block (502) in a current picture (504) to the reference block (506) in the reference index 0. In an example of FIG. 5, a scanning order starts from a center and checks four corners one by one in the reference block (506). In an example, a first available motion vector, such as a first available un-scaled motion vector, such as $mv_{L0(0\rightarrow1)}$, from the reference index 0 to the reference index 1 is selected. According to the derived intermediate MV, $mv_{L0(0\rightarrow1)}$, a reference block (508) in the reference index 1 is identified.

In an aspect, availability of a motion vector is checked firstly using the process described in FIG. 5. If no motion vector is available after scanning all positions, availability of a block vector may be checked.

In an aspect, a flag is signaled. The may be signaled in a high-level syntax, such as a sequence parameter set (SPS), a picture parameter set (PPS), an adaptation parameter set (APS), a picture header, a slice header, to indicate whether a block vector (e.g., $bv_{(1\rightarrow1)}$ in FIG. 4) is used for the chain-based MV or MVP construction.

In an example of FIG. 4, the derived chain-based MVP for the reference index 2 may be equal to $mv_{L0(0)}+mv_{L0(0\rightarrow1)}+bv_{(1\rightarrow1)}+mv_{L0(1\rightarrow2)}$ when the block vector is determined to be used for the chain-based MVP construction.

In an example of FIG. 4, the derived chain-based MVP for the reference index 2 may be equal to $mv_{L0(0)}+mv_{L0(0\rightarrow1)}+mv_{L0(1\rightarrow2)}$) when the block vector is determined not to be used for the chain-based MVP construction.

In an aspect, a maximum tracing depth (e.g., a maximum lookahead/lookbehind depth) is applied to constrain a total tracing depth (also referred to as a depth) of the chain-based MV or MVP derivation. In an aspect, a total number of the plurality of intermediate vectors that is defined between the current picture and a final reference picture (e.g., the reference picture indicated by the reference index 2 in FIG. 4) is determined according to the maximum trace depth.

In an example, when BV is added to derive the chain-based MV or MVP, BV is not considered to increase the depth of the propagation, and thus the depth of the propagation increases by 1 with each additional intermediate MV. In this case, the total tracing depth of the MVP propagation is based on a number of intermediate MVs used in the chain-based MV or MVP derivation. For example, the total tracing depth of the MVP propagation is equal to the number of intermediate MVs—1 (e.g., excluding the initial vector).

Referring to FIG. 4, a depth of the initial vector $mv_{L0(0)}$ is 0, a depth of the intermediate MV $mv_{L0(0\rightarrow1)}$ and a depth of $bv_{L0(1\rightarrow1)}$are 1, and a depth of the intermediate MV $mv_{L0(1\rightarrow2)}$is 2. The total tracing depth of the MVP propagation when the intermediate vectors include $mv_{L0(0)}$, $mv_{L0(0\rightarrow1)}$, $bv_{(1\rightarrow1)}$, and $mv_{L0(1\rightarrow2)}$ is 2.

In an example, when BV is added to derive the chain-based MV or MVP, BV is considered to increase the depth of the propagation, and thus the depth of the propagation increases by 1 with each additional intermediate vector (e.g., an intermediate MV or an intermediate BV). In this case, the total tracing depth of the MVP propagation is based on a number of intermediate vectors (e.g., MVs and BVs) used in the chain-based MV or MVP derivation. For example, the total tracing depth of the MVP propagation is equal to the number of intermediate vectors—1 (e.g., excluding the initial vector). Referring to FIG. 4, the depth of the initial vector $mv_{L0(0)}$ is 0, the depth of the intermediate MV $mv_{L0(0\rightarrow1)}$ is 1, the depth of $bv_{L0(1\rightarrow1)}$ is 2, and the depth of the intermediate MV $mv_{L0(1\rightarrow2)}$ is 3. The total tracing depth of the MVP propagation when the intermediate vectors include $mv_{L0(0)}$, $mv_{L0(0\rightarrow1)}$, $bv_{(1\rightarrow1)}$, and $mv_{L0(1\rightarrow2)}$ is 3. If the maximum tracing depth is 2, then $mv_{L0(1\rightarrow2)}$ may not be used to derive the chain-based MVP.

Figure 6A:
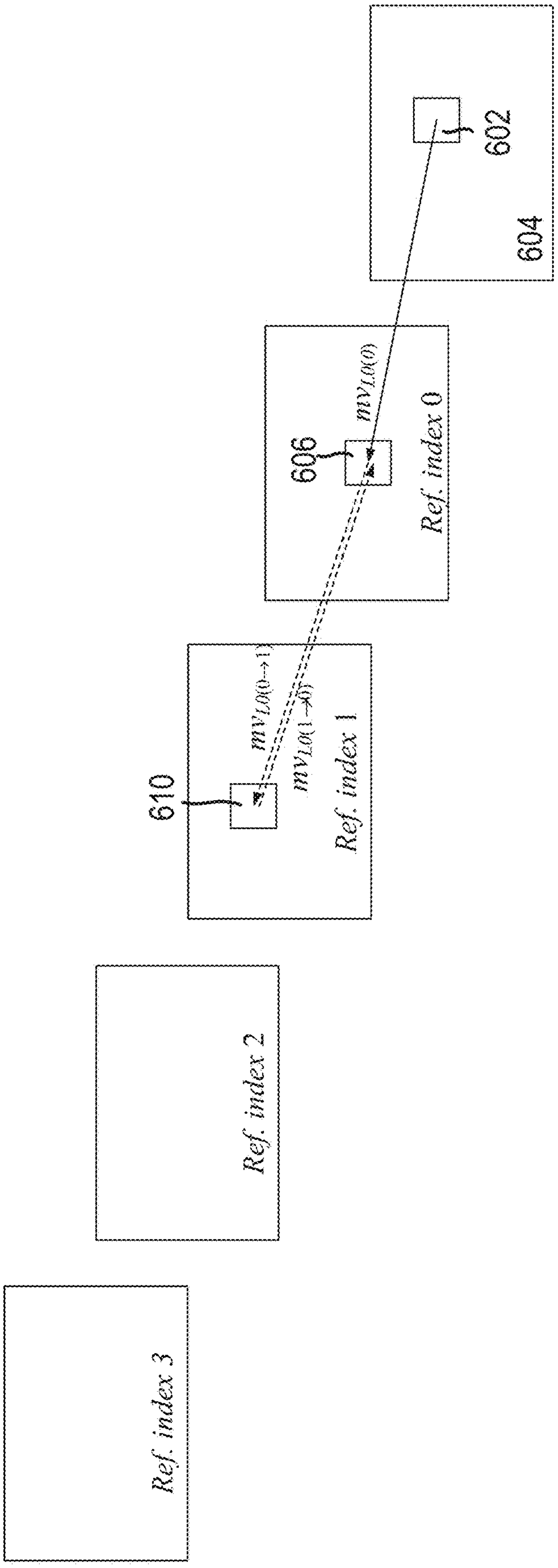
FIGS. 6A-6B show examples of closed loops formed by intermediate vectors during a chained MV/MVP derivation according to an aspect of the disclosure.
Figure 6B:
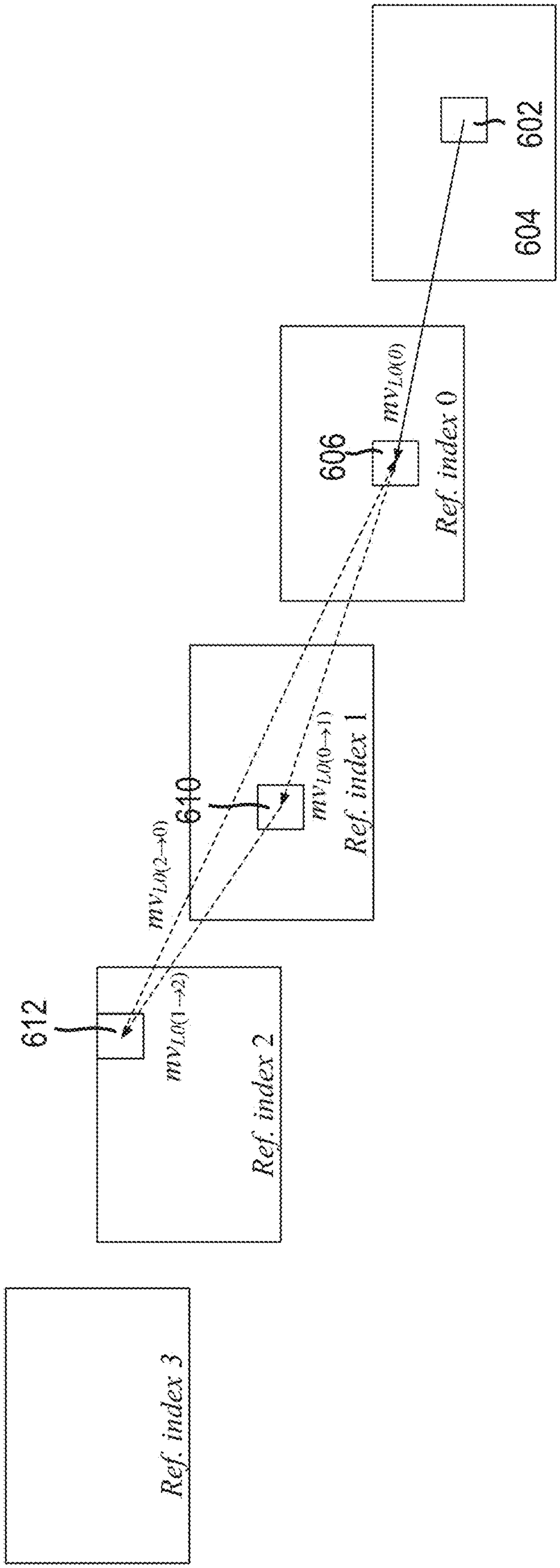

In some examples, checking whether an intermediate vector (e.g., a lookahead/lookbehind MV or BV) exists or not may not be sufficient to derive the chain-based MV and/or chain-based MVP. For example, a closed loop (also referred to as a deadlock chained loop or a deadlock loop) may occur under certain conditions when intermediate vector(s) are available. FIGS. 6A-6B show examples of closed loops for chain-based MVP derivation at a reference index 3 in the reference list 0 according to an aspect of the disclosure. In an example, the chain-based MVP derivation is used to derive a chain-based MVP that points to a target reference picture that is indicated by the reference index 3.

FIG. 6A shows an example where two motion vectors ($mv_{L0(0\rightarrow1)}$ and $mv_{L0(1\rightarrow2)}$) are true forward and backward motion vectors to each other. In FIG. 6A, an initial vector $mv_{L0(0)}$ points from a current block (602) in a current picture (604) to a block (606) in a reference picture indicated by a reference index 0. An intermediate MV $mv_{L0(0\rightarrow1)}$ is determined, for example, using the process described in FIG. 5, and is available. $mv_{L0(0\rightarrow1)}$ is defined between the reference picture indicated by the reference index 0 and a reference picture indicated by a reference index 1. An MV $mv_{L0(1\rightarrow0)}$ is determined, for example, using the process described in FIG. 5, and is available. $mv_{L0(1\rightarrow0)}$ is defined between the reference picture indicated by the reference index 1 and the reference picture indicated by the reference index 0. In the example shown in FIG. 6A, the intermediate MV $mv_{L0(0\rightarrow1)}$ and the intermediate MV $mv_{L0(1\rightarrow0)}$ are true motion vectors for two blocks (606) and (610), respectively. In an example, a vector sum of $mv_{L0(1\rightarrow0)}$ and $mv_{L0(1\rightarrow0)}$ is a zero vector. As shown in FIG. 6A, when two adjacent intermediate MVs are true forward and backward motion vectors for each other, the two adjacent intermediate MVs form a close loop (or a deadlock loop), and thus a chain-based MV or MVP that points to a target reference picture that is indicated by the reference index 3 may not be obtained with a finite number of intermediate MVs/BVs.

FIG. 6B shows an example where multiple intermediate MVs form a close loop. In FIG. 6B, $mv_{L0(0\rightarrow1)}$ is derived based on the block (606) (e.g., from the block (606)) in the reference picture indicated by the reference index 0, and $mv_{L0(1\rightarrow2)}$ is derived at the block (610) pointed by $mv_{L0(0\rightarrow1)}$, and then $mv_{L0(2\rightarrow0)}$ is derived at a reference picture indicated by a reference index 2 and points to the block (606) in the reference picture indicated by the reference index 0. Thus, the close loop is formed by the 3 intermediate MVs, $mv_{L0(0\rightarrow1)}$, $mv_{L0(1\rightarrow2)}$, and $mv_{L0(2\rightarrow0)}$. In an example, a vector sum based on $mv_{L0(0\rightarrow1)}$, $mv_{L0(1\rightarrow2)}$, and $mv_{L0(2\rightarrow0)}$ with or without scaling is a zero vector. In an example, a vector sum of $mv_{L0(0\rightarrow1)}$, $mv_{L0(1\rightarrow2)}$, and $mv_{L0(2\rightarrow0)}$ with or without scaling is a zero vector.

Referring to FIG. 6A or 6B, a deadlock loop or a close loop may be formed by consecutively traced or consecutive intermediate vectors that are derived in a traverse order. The traverse order may be from the first intermediate vector to the last intermediate vector in the consecutive intermediate vectors. The first intermediate vector starts from (e.g., points from) a first node (or a first block) and the last intermediate vector points back to the first node. Referring to FIG. 6A, the first intermediate vector $mv_{L0(0\rightarrow1)}$ starts from a first node (or a first block) (the block (606)) and the last intermediate vector $mv_{L0(1\rightarrow0)}$) points back to the first node.

The deadlock chained loops in the above description may result in a relatively large size such as an infinite size (e.g., an infinite number of intermediate MVs/BVs used to derive a chain-based MV or chain-based MVP) of the chained-based MV or the chained-based MVP, and infinite (or relatively large size) chain-based MV or MVP derivation may not be desirable in some examples. Accordingly, a method of chain-based MV and chain-based MVP derivation is disclosed. The chain-based MV and MVP derivation process may be used to obtain intermediate MV(s) and/or intermediate BV(s) that avoid a deadlock loop in the derivation of the chained-based MV or the chained-based MVP. In an example, the derivation of a chain-based MV and chain-based MVP is performed using the MV and the MVP lookahead/lookbehind technique.

According to an aspect of the disclosure, an intermediate MV or BV may be derived not only based on whether the intermediate MV or BV exists or not at each respective node (e.g., an intermediate block where the intermediate MV or BV is derived such as the block (506) shown in FIG. 5) but also based on at least one of the following information, i) reference picture information of the intermediate MV or BV, ii) reference picture information (or current reference picture information) of the current block for which the chain-based MV/MVP is derived, iii) a position or a coordinate pointed by the intermediate MV/BV, and iv) history reference picture information and previously derived MV or BV information during a traversal of chain-based MV/MVP derivation before each node. In an aspect, the intermediate MV or BV is valid when at least one of above four pieces of information satisfies a condition, as described in details below.

In an aspect, referring to FIG. 6B, the initial vector $mv_{L0(0)}$ points to the block (606) at the reference index 0. During the chain-based MV/MVP derivation to derive the chain-based MV/MVP at the reference picture indicated by the reference index 3, the traversal of the chain-based MV/MVP derivation includes obtaining intermediate vectors (e.g., MV(s)/BV(s)) at each node (e.g., (606), (610), and (612)), for example, sequentially, until an intermediate vector points to a block in the reference picture indicated by the reference index 3. In FIG. 6B, after determining the initial vector $mv_{L0(0)}$ and the intermediate MV $mv_{L0(0\rightarrow1)}$, the intermediate MV or BV at a node (e.g., the block (610)) is derived as $mv_{L0(1\rightarrow2)}$ in FIG. 6B and is referred to as a current intermediate vector. The current intermediate vector $mv_{L0(1\rightarrow2)}$ points to a first block (e.g., (612)) in a first reference picture (e.g., indicated by the reference index 2)

from the second block (e.g., the block (610)) in the second reference picture (e.g., indicated by the reference index 1) and is available (or exists).

The reference picture information of the current intermediate vector may include first reference picture information of the first reference picture indicated by the reference index 2. The position or the coordinate pointed by the current intermediate vector $mv_{L0(1\rightarrow2)}$ is a position of the first block or the block (612) in FIG. 6B.

The history reference picture information and previously derived MV or BV information during the traversal of chain-based MV/MVP derivation before the node (or the block) (610) may include history information associated with at least one previously derived intermediate vector that is associated with nodes, for example, from the current block (602) in the current picture (604) to the second block (610) in the second reference picture. The at least one previously derived intermediate vector associated with the blocks (602), (606), and (610) includes $mv_{L0(0)}$ and $mv_{L0(0\rightarrow1)}$. The history reference picture information during the traversal of chain-based MV/MVP derivation before the block (610) includes reference picture information of $mv_{L0(0)}$ and $mv_{L0(0\rightarrow1)}$, such as reference picture information of reference pictures indicated by the reference indices 0-2. The previously derived MV or BV information includes information of mv $L_{0(0)}$ and $mv_{L0(0\rightarrow1)}$.

Whether the current intermediate vector is valid for use in deriving one of a chain-based MV and a chain-based MVP for the current block (602) may be determined based on one or more of (i) the first reference picture information of the first reference picture, (ii) the current reference picture information of the current block, (iii) the position of the first block, and (iv) the history information associated with the at least one previously derived intermediate vector that is associated with the current block (602) in the current picture (604), the second block (610) in the second reference picture, and zero or more nodes between the current block (602) and the second block (610). When the current intermediate vector is determined to be valid, the one of the chain-based MV and the chain-based MVP for the current block may be determined based on the current intermediate vector and the at least one previously derived intermediate vector. In an example, the current block (602) may be reconstructed based on the one of the chain-based MV and the chain-based MVP.

In an example, when the current intermediate vector is determined not to be valid, the current intermediate vector $mv_{L0(1\rightarrow2)}$ is not used in deriving the one of the chain-based MV and the chain-based MVP for the current block. Referring to FIGS. 5 and 6B, a different MV may be derived from the block (610) as a new current intermediate vector $mv'_{L0(1\rightarrow2)}$ and the above process may be repeated for the new $mv'_{L0(1\rightarrow2)}$. In some examples, a new intermediate vector may be derived to replace one or more previously derived intermediate vector. For example, a new intermediate vector $mv'_{L0(0\rightarrow1)}$ may be derived from the block (606) to replace the previously derived intermediate vector $mv_{L0(0\rightarrow1)}$.

In an aspect, when the current intermediate vector exists, the current intermediate vector is considered as valid only if the reference picture pointed by the current intermediate vector is one of the reference pictures of the current block. In an example, the current reference picture information of the current block indicates one or more reference pictures of the current block, and the current intermediate vector is determined as valid when the first reference picture indicated by the first reference picture information is one of the one or more of the reference pictures of the current block.

In an aspect, when the current intermediate vector exists, the current intermediate vector is considered as valid only if an inter prediction direction of the current intermediate vector is equal to an inter prediction direction during the chain-based MV/MVP derivation.

In an example, when the chained MV/MVP derivation is for L0, the inter prediction direction is L0 or a forward prediction direction, and only intermediate MVs having L0 (e.g., the intermediate MVs pointing to reference pictures in L0) are checked. Intermediate MVs having L1 are not used in the chain-based MV/MVP derivation for L0. For example, only a forward intermediate MV is used for a forward chain-based MVP derivation.

In an example, when the chained MV/MVP derivation is for L1, the inter prediction direction is L1 or a backward prediction direction, and only intermediate MVs having L1 are checked. Intermediate MVs having L0 are not used in the chain-based MV/MVP derivation for L1.

In an example, the inter prediction direction for the derivation of the at least one previously derived intermediate vector indicated by the history information is the inter prediction direction during the chain-based MV/MVP derivation. The current intermediate vector may be determined to be valid when the inter prediction direction indicated by the first reference picture information is the same as the inter prediction direction for the derivation of the at least one previously derived intermediate vector indicated by the history information.

In an aspect, when the current intermediate vector exists, the current intermediate vector is considered as valid only if a picture order count (POC) difference between the reference picture pointed by the current intermediate vector (e.g., the first reference picture indicated by the reference index 2 when the current intermediate vector is $mv_{L0(1\rightarrow2)}$) and the current picture (e.g., $abs(POC_{ref}-POC_{cur})$) is smaller than or equal to a predefined number. In an example, the current intermediate vector is valid when $abs(POC_{ref}-POC_{cur})$ is smaller than the predefined number.

In an example, the current intermediate vector is valid when an absolute difference (e.g., $abs\ (POC_{ref}-POC_{cur})$) between the POC of the first reference picture, $POC_{ref}$, indicated by the first reference picture information and a POC of the current picture, $POC_{cur}$, is smaller than or equal to the predefined number.

The predefined number may be a fixed number or may be signaled in high level syntax such as an SPS, a PPS, an APS, a picture header, a slice header, or the like.

In an aspect, when the current intermediate vector (e.g., an intermediate MV or BV) exists, the current intermediate vector is considered as valid only if a deadlock chained loop is not determined, e.g., there is no deadlock chained loop in the chain-based MV/MVP derivation. In an example, when there is a deadlock loop, an intermediate MV that points to the target reference picture of the current block may not be obtained during the chain-based MV/MVP traversal. Referring to FIG. 6A or 6B, when the deadlock loop occurs, no intermediate MV points to the target reference picture of the current block (602), which is the reference picture indicated by the reference index 3.

In an example, consecutive intermediate vectors derived in the traverse order for the one of the chain-based MV and the chain-based MVP for the current block include the current intermediate vector (e.g., $mv_{L0(2\rightarrow0)}$ in FIG. 6B) and one or more (e.g., $mv_{L0(0\rightarrow1)}$ and $mv_{L0(1\rightarrow2)}$ in FIG. 6B) of the at least one previously derived intermediate vector. The traverse order is from a first intermediate vector (e.g., $mv_{L0(0\rightarrow1)}$ in FIG. 6B) to a last intermediate vector in the consecutive intermediate vectors. The last intermediate vector may be the current intermediate vector (e.g., $mv_{L0(2\rightarrow0)}$ in FIG. 6B). As described above, the current intermediate vector points to the first block (e.g., the block (606) in FIG. 6B). In an example, the current intermediate vector is not valid when the first intermediate vector (e.g., $mv_{L0(0\rightarrow1)}$ in FIG. 6B) points from the first block.

In an example, whether a vector sum based on the current intermediate vector and one or more of the at least one previously derived intermediate vector is a zero vector is determined. The vector sum may be a vector sum of (i) the current intermediate vector and one or more of the at least one previously derived intermediate vector without scaling or (ii) the current intermediate vector and one or more of the at least one previously derived intermediate vector with suitable scaling. Referring to FIG. 6B, the current intermediate vector is $mv_{L0(2\rightarrow0)}$, and the one or more of the at least one previously derived intermediate vector includes $mv_{L0(0\rightarrow1)}$ and $mv_{L0(1\rightarrow2)}$. The current intermediate vector $mv_{L0(2\rightarrow0)}$ and the one or more of the at least one previously derived intermediate vector $mv_{L0(0\rightarrow1)}$ and $mv_{L0(1\rightarrow2)}$ may be consecutive in a traverse order in deriving the one of the chain-based MV and the chain-based MVP for the current block. Referring to FIG. 6B, the traverse order is from $mv_{L0(0\rightarrow1)}$ to $mv_{L0(1\rightarrow2)}$ and then to $mv_{L0(2\rightarrow0)}$. When the vector sum of the current intermediate vector and the one or more of the at least one previously derived intermediate vector is determined to be the zero vector (e.g., the vector sum of mv $mv_{L0(0\rightarrow1)}$, $mv_{L0(1\rightarrow2)}$, and $mv_{L0(2\rightarrow1)}$ is zero), the current intermediate vector is determined as not valid.

This condition related to deadlock loop can be suitably adapted to the case when the current intermediate vector is an intermediate BV.

In an aspect, when the current intermediate vector exists, the current intermediate vector is considered as valid only if a current linking size (or a current tracing depth) of the current intermediate vector satisfies a condition. In an example, the condition is that the current linking size of the current intermediate vector is smaller than or equal to a predefined number for the chain-based MV/MVP derivation. In an example, the condition is that the current linking size of the current intermediate vector is smaller than a predefined number for the chain-based MV/MVP derivation.

In an example, the current intermediate vector and the at least one previously derived intermediate vector include (i) at least one MV and (ii) zero or more BVs. When the zero or more BVs are excluded from determining a respective linking size of each of the current intermediate vector and the at least one previously derived intermediate vector, the current linking size of the current intermediate vector is determined based on a number of the at least one MV. When the zero or more BVs are included in determining the respective linking size of each of the current intermediate vector and the at least one previously derived intermediate vector, the current linking size of the current intermediate vector is determined based on a number of the (i) at least one MV and (ii) the zero or more BVs. The current intermediate vector is determined as valid when the current linking size of the current intermediate vector is smaller than or equal to the predefined number. Referring to FIG. 6B, the linking sizes of $mv_{L0(0)}$, $mv_{L0(0\rightarrow1)}$, $mv_{L0(1\rightarrow2)}$, and $mv_{L0(2\rightarrow0)}$ are 0, 1, 2, and 3, respectively when the linking size of the initial vector is counted as 0. If the predefined number is 2 and the condition is that the current linking size of the current intermediate vector is smaller than or equal to the predefined number, $mv_{L0(2\rightarrow0)}$ is not valid.

In an example, the at least one previously derived intermediate vector includes at least one MV. A current linking size of the current intermediate vector is determined based on a number of the at least one MV included in the at least one previously derived intermediate vector.

In an aspect, when the current intermediate vector and the at least one previously derived intermediate vector include at least one MV and do not include BVs, the current linking size of the current intermediate vector may be determined based on a number of the at least one MV.

When the current intermediate vector and the at least one previously derived intermediate vector include the at least one MV and at least one BV and when the at least one BV is not counted in calculating a respective linking size of each of the current intermediate vector and the at least one previously derived intermediate vector, the current linking size of the current intermediate vector may be determined based on the number of the at least one MV. When the current intermediate vector and the at least one previously derived intermediate vector include the at least one MV and the at least one BV and when the at least one BV is counted in calculating the respective linking size of each of the current intermediate vector and the at least one previously derived intermediate vector, the current linking size of the current intermediate vector is determined based on a number of the (i) at least one MV and (ii) the at least one BV. The current intermediate vector is determined to be valid when the current linking size of the current intermediate vector is smaller than or equal to the predefined number, such as 2, 3, 4, or the like.

This condition related to the linking size can be suitably adapted to the case when the current intermediate vector is an intermediate BV.

In an aspect, when the current intermediate vector exists, the current intermediate vector is considered as valid only if the coordinate pointed by the current intermediate vector is within a predefined area.

In an example, the predefined area size is equal to a co-located CTU size of each reference picture. In an example, the location of the predefined area size in the reference picture is co-located with a current CTU including the current block in the current picture. Referring to FIG. 6A, when the current intermediate vector is $mv_{L0(0\rightarrow1)}$, the location of the predefined area size in the reference picture refers to the location of the predefined area size in the reference picture indicated by the reference index 1, and the coordinate refers to the coordinate or the location of the block (610).

In an example, the location of the predefined area size is co-located with a previous CTU in a previous reference picture indicated by a previous reference index. Referring to FIG. 6A, when the current intermediate vector is $mv_{L0(0\rightarrow1)}$, the location of the predefined area size in the reference picture refers to the location of the predefined area size in the reference picture indicated by the reference index 1, the coordinate refers to the coordinate or the location of the block (610), and the location of the predefined area size is co-located with a previous CTU in a previous reference picture indicated by a previous reference index which is the reference index 0.

In an example, the predefined area is equal to N co-located CTU row(s) of each reference picture, and N is a non-zero positive value.

In an example, the predefined area is equal to the co-located CTU and its neighboring (N−1) CTUs in the same CTU row, where N is a positive value and N>1. The neighboring (N−1) CTUs can be to the left and/or to the right of the co-located CTU.

This condition related to the predefined area can be suitably adapted to the case when the current intermediate vector is an intermediate BV.

The term "AMVP mode" may refer to the AMVP mode or a variant. The term "merge mode" may refer to the merge mode or a variant. The term "chain-based MV/MVP derivation" may refer to the chain-based MV/MVP derivation or a variant.

Figure 7:
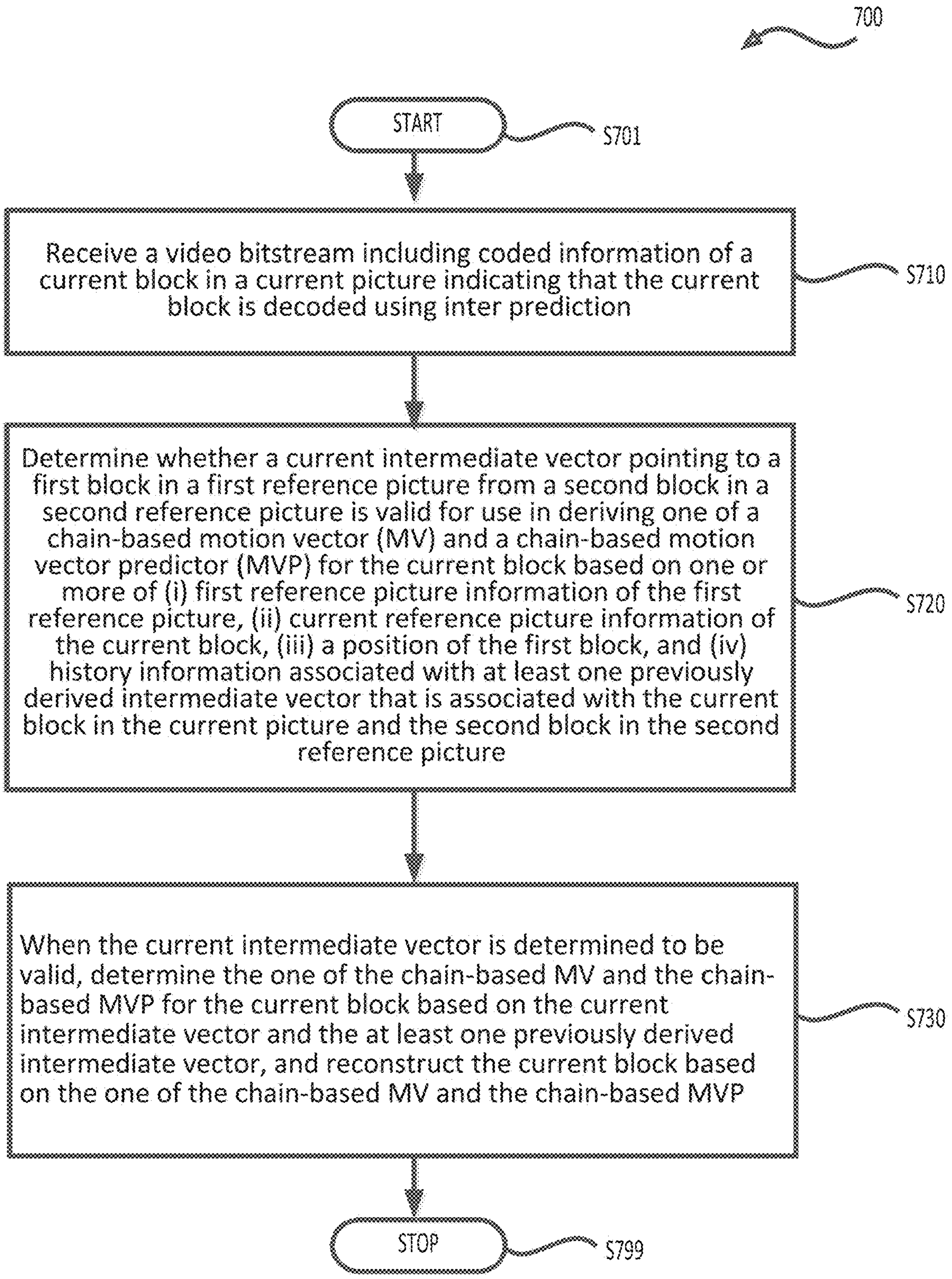
FIG. 7 shows a flow chart outlining a decoding process according to some aspects of the disclosure.

FIG. 7 shows a flow chart outlining a process (700) according to an aspect of the disclosure. The process (700) may be used in an apparatus, such as a video decoder. In various aspects, the process (700) is executed by processing circuitry, such as the processing circuitry that performs functions of the video decoder (110), the processing circuitry that performs functions of the video decoder (210), and the like. In some aspects, the process (700) is implemented in software instructions, thus when the processing circuitry executes the software instructions, the processing circuitry performs the process (700). The process starts at (S701) and proceeds to (S710).

At (S710), a video bitstream including coded information of a current block in a current picture indicating that the current block is decoded using inter prediction is received.

At (S720), whether a current intermediate vector pointing to a first block in a first reference picture from a second block in a second reference picture is valid for use in deriving one of a chain-based motion vector (MV) and a chain-based motion vector predictor (MVP) for the current block is determined based on one or more of (i) first reference picture information of the first reference picture, (ii) current reference picture information of the current block, (iii) a position of the first block, and (iv) history information associated with at least one previously derived intermediate vector that is associated with the current block in the current picture and the second block in the second reference picture.

At (S730), when the current intermediate vector is determined to be valid, the one of the chain-based MV and the chain-based MVP for the current block is determined based on the current intermediate vector and the at least one previously derived intermediate vector, and the current block is reconstructed based on the one of the chain-based MV and the chain-based MVP.

Then, the process proceeds to (S799) and terminates.

The process (700) may be suitably adapted. Step(s) in the process (700) may be modified and/or omitted. Additional step(s) may be added. Any suitable order of implementation may be used.

In an example, the current reference picture information of the current block indicates one or more reference pictures of the current block, and the current intermediate vector is determined to be valid when the first reference picture indicated by the first reference picture information is one of the one or more of the reference pictures of the current block.

In an example, the current intermediate vector is determined to be valid when an inter prediction direction indicated by the first reference picture information is the same as an inter prediction direction for the derivation of the at least one previously derived intermediate vector indicated by the history information.

In an example, the current intermediate vector is determined to be valid when an absolute difference between a picture order count (POC) of the first reference picture indicated by the first reference picture information and a POC of the current picture is smaller than or equal to a predefined number.

In an example, consecutive intermediate vectors derived in a traverse order for the one of the chain-based MV and the chain-based MVP for the current block include the current intermediate vector and one or more of the at least one previously derived intermediate vector, the traverse order is from a first intermediate vector to a last intermediate vector in the consecutive intermediate vectors, and the last intermediate vector is the current intermediate vector. The current intermediate vector is determined as not valid when the first intermediate vector points from the first block.

In an example, the at least one previously derived intermediate vector includes at least one MV. A current linking size of the current intermediate vector is determined based on a number of the at least one MV included in the at least one previously derived intermediate vector. The current intermediate vector is determined to be valid when the current linking size of the current intermediate vector is smaller than or equal to a predefined number.

In an example, the current intermediate vector is determined as valid when the position of the first block indicated by the current intermediate vector is within a predefined area.

In an example, the current block is decoded using a merge mode, the one of the chain-based MV and the chain-based MVP for the current block is the chain-based MV for the current block, and the current block is reconstructed based on the chain-based MV.

In an example, the current block is decoded using an advanced MVP (AMVP) mode, the one of the chain-based MV and the chain-based MVP for the current block is the chain-based MVP for the current block, an MVP candidate list including the chain-based MVP for the AMVP mode is constructed, and the current block is reconstructed based on (i) an MVP candidate from the MVP candidate list and (ii) an motion vector difference (MVD).

Figure 8:
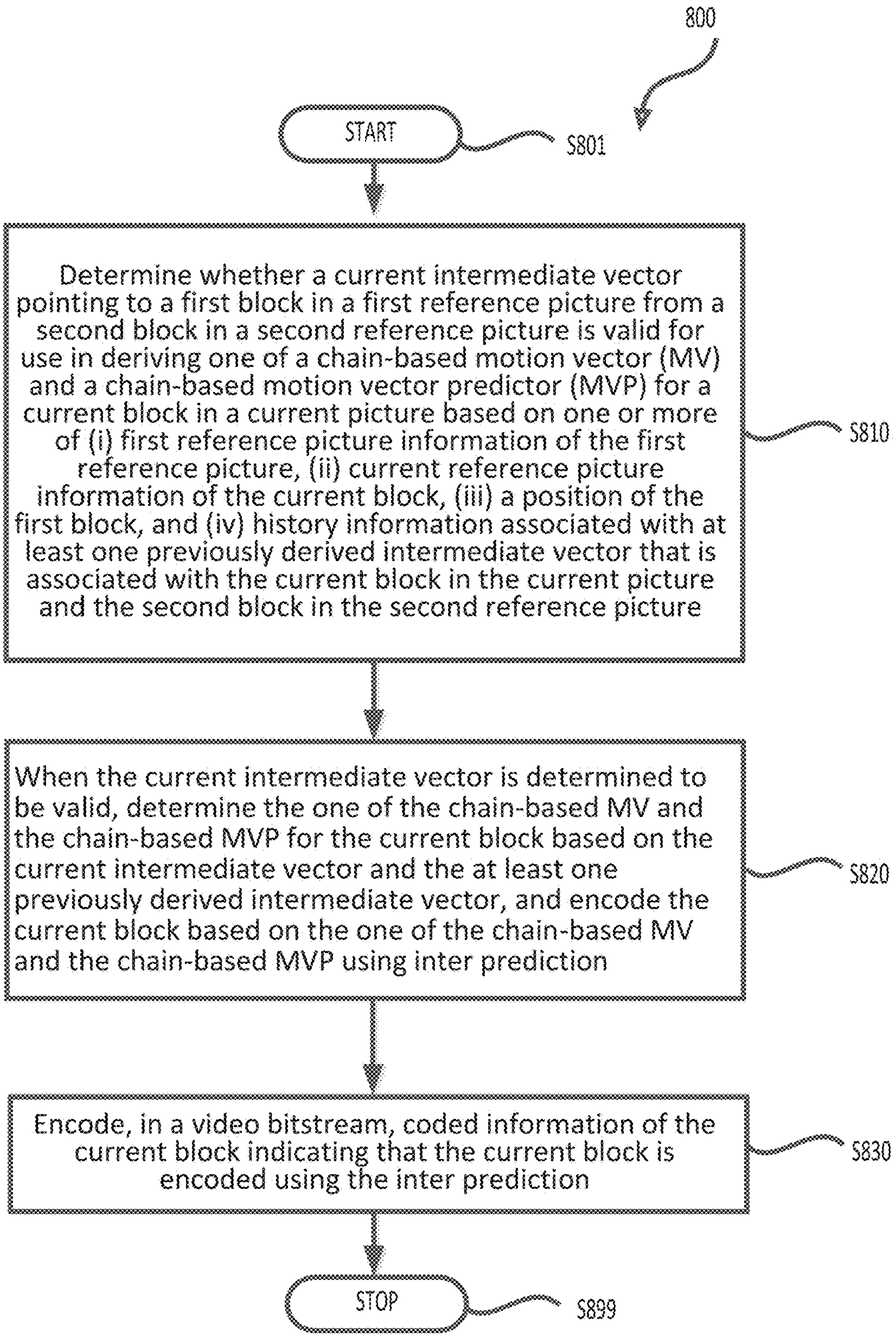
FIG. 8 shows a flow chart outlining an encoding process according to an aspect of the disclosure.

FIG. 8 shows a flow chart outlining a process (800) according to an embodiment of the disclosure. The process (800) can be used in a video encoder. In various embodiments, the process (800) is executed by processing circuitry, such as the processing circuitry that performs functions of the video encoder (103), the processing circuitry that performs functions of the video encoder (303), and the like. In some embodiments, the process (800) is implemented in software instructions, thus when the processing circuitry executes the software instructions, the processing circuitry performs the process (800). The process (800) starts at (S801) and proceeds to (S810).

At (S810), whether a current intermediate vector pointing to a first block in a first reference picture from a second block in a second reference picture is valid for use in deriving one of a chain-based motion vector (MV) and a chain-based motion vector predictor (MVP) for a current block in a current picture is determined based on one or more of (i) first reference picture information of the first reference picture, (ii) current reference picture information of the current block, (iii) a position of the first block, and (iv) history information associated with at least one previously derived intermediate vector that is associated with the current block in the current picture and the second block in the second reference picture.

At (S820), when the current intermediate vector is determined to be valid, the one of the chain-based MV and the chain-based MVP for the current block is determined based on the current intermediate vector and the at least one previously derived intermediate vector, and the current block is encoded based on the one of the chain-based MV and the chain-based MVP using inter prediction.

At (S830), coded information of the current block indicating that the current block is encoded using the inter prediction is encoded in a video bitstream.

Then, the process (800) proceeds to (S899) and terminates.

The process (800) can be suitably adapted. Step(s) in the process (800) can be modified and/or omitted. Additional step(s) can be added. Any suitable order of implementation can be used.

In an aspect, a method of processing visual media data includes processing a video bitstream of the visual media data according to a format rule. For example, the bitstream may be a bitstream that is decoded/encoded in any of the decoding and/or encoding methods described herein. The format rule may specify one or more constraints of the bitstream and/or one or more processes to be performed by the decoder and/or encoder.

In an aspect, the bitstream includes coded information of a current block in a current picture indicating that the current block is decoded using inter prediction. The format rule specifies that: whether a current intermediate vector pointing to a first block in a first reference picture from a second block in a second reference picture is valid for use in deriving one of a chain-based motion vector (MV) and a chain-based motion vector predictor (MVP) for the current block is determined based on one or more of (i) first reference picture information of the first reference picture, (ii) current reference picture information of the current block, (iii) a position of the first block, and (iv) history information associated with at least one previously derived intermediate vector that is associated with the current block in the current picture and the second block in the second reference picture, and when the current intermediate vector is determined to be valid, the one of the chain-based MV and the chain-based MVP for the current block is determined based on the current intermediate vector and the at least one previously derived intermediate vector, and the current block is reconstructed based on the one of the chain-based MV and the chain-based MVP.

Compared to related technologies that derive a chain-based MV or a chain-based MVP, the methods described in the disclosure not only determine if an intermediate vector is available, but also determine whether the intermediate vector is valid, and thus eliminating or reducing the occurrence of deadlock loops during the traversal of the chained-based MV/MVP derivation. Accordingly, a number of iterations in the traversal and/or a number of MVs/BVs used in deriving the chain-based MV/MVP may be reduced, and thus increasing computational efficiency.

Methods, aspects and/or examples in the disclosure may be used separately or combined in any order. For example, some aspects and/or examples performed by the decoder may be performed by the encoder and vice versa. Each of the methods (or aspects), an encoder, and a decoder may be implemented by processing circuitry (e.g., one or more processors or one or more integrated circuits). In one example, the one or more processors execute a program that is stored in a non-transitory computer-readable medium.

The techniques described above, may be implemented as computer software using computer-readable instructions and physically stored in one or more computer-readable media. For example, FIG. 9 shows a computer system (900) suitable for implementing certain aspects of the disclosed subject matter.

The computer software may be coded using any suitable machine code or computer language, that may be subject to assembly, compilation, linking, or like mechanisms to create code comprising instructions that may be executed directly, or through interpretation, micro-code execution, and the like, by one or more computer central processing units (CPUs), Graphics Processing Units (GPUs), and the like.

The instructions may be executed on various types of computers or components thereof, including, for example, personal computers, tablet computers, servers, smartphones, gaming devices, internet of things devices, and the like.

Figure 9:
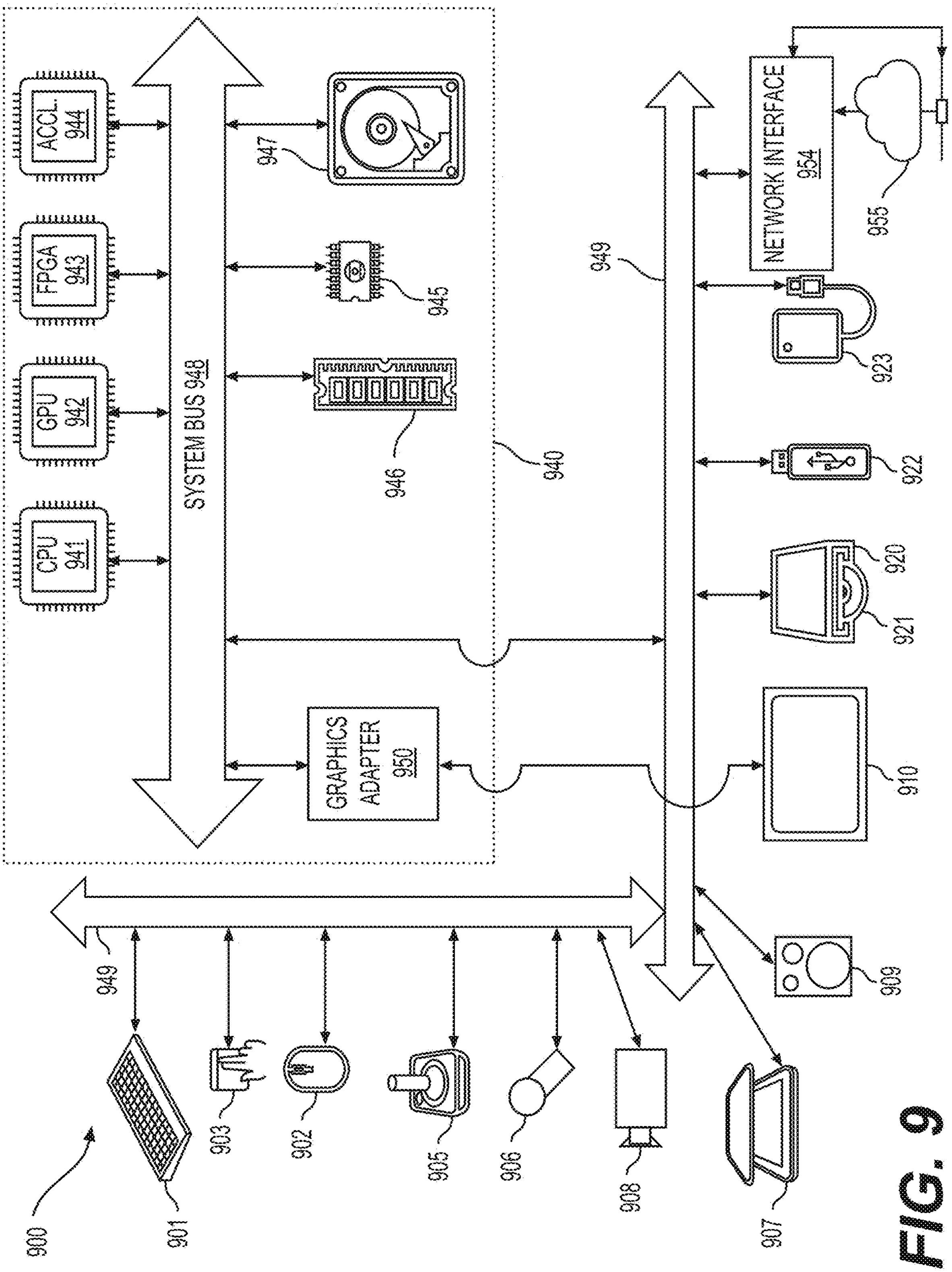
FIG. 9 is a schematic illustration of a computer system in accordance with an aspect.

The components shown in FIG. 9 for computer system (900) are examples and are not intended to suggest any limitation as to the scope of use or functionality of the computer software implementing aspects of the present disclosure. Neither should the configuration of components be interpreted as having any dependency or requirement relating to any one or combination of components illustrated in the example aspect of a computer system (900).

Computer system (900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices may also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (901), mouse (902), trackpad (903), touch screen (910), data-glove (not shown), joystick (905), microphone (906), scanner (907), camera (908).

Computer system (900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (910), data-glove (not shown), or joystick (905), but there may also be tactile feedback devices that do not serve as input devices), audio output devices (such as: speakers (909), headphones (not depicted)), visual output devices (such as screens (910) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (900) may also include human accessible storage devices and their associated media such as optical media including CD/DVD ROM/RW (920) with CD/DVD or the like media (921), thumb-drive (922), removable hard drive or solid state drive (923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (900) may also include an interface (954) to one or more communication networks (955). Networks may for example be wireless, wireline, optical. Networks may further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (949) (such as, for example USB ports of the computer system (900)); others are commonly integrated into the core of the computer system (900) by attachment to a system bus as described below (for example Ethernet interface into a PC computer system or cellular network interface into a smartphone computer system). Using any of these networks, computer system (900) may communicate with other entities. Such communication may be uni-directional, receive only (for example, broadcast TV), uni-directional send-only (for example CANbus to certain CANbus devices), or bi-directional, for example to other computer systems using local or wide area digital networks. Certain protocols and protocol stacks may be used on each of those networks and network interfaces as described above.

Aforementioned human interface devices, human-accessible storage devices, and network interfaces may be attached to a core (940) of the computer system (900).

The core (940) may include one or more Central Processing Units (CPU) (941), Graphics Processing Units (GPU) (942), specialized programmable processing units in the form of Field Programmable Gate Areas (FPGA) (943), hardware accelerators for certain tasks (944), graphics adapters (950), and so forth. These devices, along with Read-only memory (ROM) (945), Random-access memory (946), internal mass storage such as internal non-user accessible hard drives, SSDs, and the like (947), may be connected through a system bus (948). In some computer systems, the system bus (948) may be accessible in the form of one or more physical plugs to enable extensions by additional CPUs, GPU, and the like. The peripheral devices may be attached either directly to the core's system bus (948), or through a peripheral bus (949). In an example, the screen (910) may be connected to the graphics adapter (950). Architectures for a peripheral bus include PCI, USB, and the like.

CPUs (941), GPUs (942), FPGAs (943), and accelerators (944) may execute certain instructions that, in combination, may make up the aforementioned computer code. That computer code may be stored in ROM (945) or RAM (946). Transitional data may also be stored in RAM (946), whereas permanent data may be stored for example, in the internal mass storage (947). Fast storage and retrieve to any of the memory devices may be enabled through the use of cache memory, that may be closely associated with one or more CPU (941), GPU (942), mass storage (947), ROM (945), RAM (946), and the like.

The computer readable media may have computer code thereon for performing various computer-implemented operations. The media and computer code may be those specially designed and constructed for the purposes of the present disclosure, or they may be of the kind well known and available to those having skill in the computer software arts.

As an example and not by way of limitation, the computer system having architecture (900), and specifically the core (940) may provide functionality as a result of processor(s) (including CPUs, GPUs, FPGA, accelerators, and the like) executing software embodied in one or more tangible, computer-readable media. Such computer-readable media may be media associated with user-accessible mass storage as introduced above, as well as certain storage of the core (940) that are of non-transitory nature, such as core-internal mass storage (947) or ROM (945). The software implementing various aspects of the present disclosure may be stored in such devices and executed by core (940). A computer-readable medium may include one or more memory devices or chips, according to particular needs. The software may cause the core (940) and specifically the processors therein (including CPU, GPU, FPGA, and the like) to execute particular processes or particular parts of particular processes described herein, including defining data structures stored in RAM (946) and modifying such data structures according to the processes defined by the software. In addition or as an alternative, the computer system may provide functionality as a result of logic hardwired or otherwise embodied in a circuit (for example: accelerator (944)), which may operate in place of or together with software to execute particular processes or particular parts of particular processes described herein. Reference to software may encompass logic, and vice versa, where appropriate. Reference to a computer-readable media may encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several examples of aspects, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The above disclosure also encompasses the features noted below. The features may be combined in various manners and are not limited to the combinations noted below.

(1) A method for video decoding, the method including: receiving a video bitstream including coded information of a current block in a current picture indicating that the current block is decoded using inter prediction; determining whether a current intermediate vector pointing to a first block in a first reference picture from a second block in a second reference picture is valid for use in deriving one of a chain-based motion vector (MV) and a chain-based motion vector predictor (MVP) for the current block based on one or more of (i) first reference picture information of the first reference picture, (ii) current reference picture information of the current block, (iii) a position of the first block, and (iv) history information associated with at least one previously derived intermediate vector that is associated with the current block in the current picture and the second block in the second reference picture, and when the current intermediate vector is determined to be valid, determining the one of the chain-based MV and the chain-based MVP for the current block based on the current intermediate vector and the at least one previously derived intermediate vector; and reconstructing the current block based on the one of the chain-based MV and the chain-based MVP.

(2) The method of feature (1), in which the current reference picture information of the current block indicates one or more reference pictures of the current block, and the determining whether the current intermediate vector is valid includes determining that the current intermediate vector is valid when the first reference picture indicated by the first reference picture information is one of the one or more of the reference pictures of the current block.

(3) The method of feature (1) or (2), in which the determining whether the current intermediate vector is valid comprises determining that the current intermediate vector is valid when an inter prediction direction indicated by the first reference picture information is the same as an inter prediction direction for the derivation of the at least one previously derived intermediate vector indicated by the history information.

(4) The method of any one of features (1)-(3), in which the determining whether the current intermediate vector is valid comprises determining that the current intermediate vector is valid when an absolute difference between a picture order count (POC) of the first reference picture indicated by the first reference picture information and a POC of the current picture is smaller than or equal to a predefined number.

(5) The method of any one of features (1)-(4), in which consecutive intermediate vectors derived in a traverse order for the one of the chain-based MV and the chain-based MVP for the current block include the current intermediate vector and one or more of the at least one previously derived intermediate vector, the traverse order is from a first intermediate vector to a last intermediate vector in the consecutive intermediate vectors, the last intermediate vector being the current intermediate vector, and the determining whether the current intermediate vector is valid includes determining that the current intermediate vector is not valid when the first intermediate vector points from the first block.

(6) The method of any one of features (1)-(5), in which the at least one previously derived intermediate vector includes at least one MV; the method further includes determining a current linking size of the current intermediate vector based on a number of the at least one MV included in the at least one previously derived intermediate vector; and the determining whether the current intermediate vector is valid includes determining that the current intermediate vector is valid when the current linking size of the current intermediate vector is smaller than or equal to a predefined number.

(7) The method of any one of features (1)-(6), in which the determining whether the current intermediate vector is valid comprises determining that the current intermediate vector is valid when the position of the first block indicated by the current intermediate vector is within a predefined area.

(8) The method of any one of features (1)-(7), in which the current block is decoded using a merge mode; the one of the chain-based MV and the chain-based MVP for the current block is the chain-based MV for the current block; and the reconstructing the current block includes reconstructing the current block based on the chain-based MV.

(9) The method of any one of features (1)-(7), in which the current block is decoded using an advanced MVP (AMVP) mode; the one of the chain-based MV and the chain-based MVP for the current block is the chain-based MVP for the current block; and the reconstructing the current block includes: constructing an MVP candidate list including the chain-based MVP for the AMVP mode; and reconstructing the current block based on (i) an MVP candidate from the MVP candidate list and (ii) an motion vector difference (MVD).

(10) A method for video encoding, the method including: determining whether a current intermediate vector pointing to a first block in a first reference picture from a second block in a second reference picture is valid for use in deriving one of a chain-based motion vector (MV) and a chain-based motion vector predictor (MVP) for a current block in a current picture based on one or more of (i) first reference picture information of the first reference picture, (ii) current reference picture information of the current block, (iii) a position of the first block, and (iv) history information associated with at least one previously derived intermediate vector that is associated with the current block in the current picture and the second block in the second reference picture; when the current intermediate vector is determined to be valid, determining the one of the chain-based MV and the chain-based MVP for the current block based on the current intermediate vector and the at least one previously derived intermediate vector; and encoding the current block based on the one of the chain-based MV and the chain-based MVP using inter prediction, and encoding, in a video bitstream, coded information of the current block indicating that the current block is encoded using the inter prediction.

(11) The method of feature (10), in which the current reference picture information of the current block indicates one or more reference pictures of the current block, and the determining whether the current intermediate vector is valid includes determining that the current intermediate vector is valid when the first reference picture indicated by the first reference picture information is one of the one or more of the reference pictures of the current block.

(12) The method of feature (10) or (11), in which the determining whether the current intermediate vector is valid comprises determining that the current intermediate vector is valid when an inter prediction direction indicated by the first reference picture information is the same as an inter prediction direction for the derivation of the at least one previously derived intermediate vector indicated by the history information.

(13) The method of any one of features (10)-(12), in which the determining whether the current intermediate vector is valid comprises determining that the current intermediate vector is valid when an absolute difference between a picture order count (POC) of the first reference picture indicated by the first reference picture information and a POC of the current picture is smaller than or equal to a predefined number.

(14) The method of any one of features (10)-(13), in which consecutive intermediate vectors derived in a traverse order for the one of the chain-based MV and the chain-based MVP for the current block include the current intermediate vector and one or more of the at least one previously derived intermediate vector, the traverse order is from a first intermediate vector to a last intermediate vector in the consecutive intermediate vectors, the last intermediate vector being the current intermediate vector, and the determining whether the current intermediate vector is valid includes determining that the current intermediate vector is not valid when the first intermediate vector points from the first block.

(15) The method of any one of features (10)-(14), in which the at least one previously derived intermediate vector includes at least one MV; the method further includes determining a current linking size of the current intermediate vector based on a number of the at least one MV included in the at least one previously derived intermediate vector; and the determining whether the current intermediate vector is valid includes determining that the current intermediate vector is valid when the current linking size of the current intermediate vector is smaller than or equal to a predefined number.

(16) The method of any one of features (10)-(15), in which the determining whether the current intermediate vector is valid comprises determining that the current intermediate vector is valid when the position of the first block indicated by the current intermediate vector is within a predefined area.

(17) The method of any one of features (10)-(16), in which the current block is encoded using a merge mode; the one of the chain-based MV and the chain-based MVP for the current block is the chain-based MV for the current block; and the encoding the current block includes encoding the current block based on the chain-based MV.

(18) The method of any one of features (10)-(16), in which the current block is encoded using an advanced MVP (AMVP) mode; the one of the chain-based MV and the chain-based MVP for the current block is the chain-based MVP for the current block; and the encoding the current block includes: constructing an MVP candidate list including the chain-based MVP for the AMVP mode; and encoding the current block based on (i) an MVP candidate from the MVP candidate list and (ii) an motion vector difference (MVD).

(19) A method of processing visual media data, the method including: processing a video bitstream of the visual media data according to a format rule. The bitstream includes coded information of a current block in a current picture indicating that the current block is decoded using inter prediction; and the format rule specifies that: whether a current intermediate vector pointing to a first block in a first reference picture from a second block in a second reference picture is valid for use in deriving one of a chain-based motion vector (MV) and a chain-based motion vector predictor (MVP) for the current block is determined based on one or more of (i) first reference picture information of the first reference picture, (ii) current reference picture information of the current block, (iii) a position of the first block, and (iv) history information associated with at least one previously derived intermediate vector that is associated with the current block in the current picture and the second block in the second reference picture, and when the current intermediate vector is determined to be valid, the one of the chain-based MV and the chain-based MVP for the current block is determined based on the current intermediate vector and the at least one previously derived intermediate vector; and the current block is reconstructed based on the one of the chain-based MV and the chain-based MVP.

(20) The method of feature (19), in which the current reference picture information of the current block indicates one or more reference pictures of the current block, and the format rule specifies that the current intermediate vector is determined to be valid when the first reference picture indicated by the first reference picture information is one of the one or more of the reference pictures of the current block.

(21) An apparatus for decoding, including processing circuitry that is configured to perform the method of any of features (1) to (9).

(22) An apparatus for encoding, including processing circuitry that is configured to perform the method of any of features (10) to (18).

(23) A non-transitory computer-readable storage medium storing instructions which when executed by at least one processor cause the at least one processor to perform the method of any of features (1) to (20).

What is claimed is:

1. A method for video decoding, the method comprising:

receiving a video bitstream including coded information of a current block in a current picture indicating that the current block is decoded using inter prediction;

determining whether a current intermediate vector pointing to a first block in a first reference picture from a second block in a second reference picture is valid for use in deriving one of a chain-based motion vector (MV) and a chain-based motion vector predictor (MVP) for the current block based on one or more of (i) first reference picture information of the first reference picture, (ii) current reference picture information of the current block, (iii) a position of the first block, and (iv) history information associated with at least one previously derived intermediate vector that is associated with the current block in the current picture and the second block in the second reference picture, and when the current intermediate vector is determined to be valid, determining the one of the chain-based MV and the chain-based MVP for the current block based on the current intermediate vector and the at least one previously derived intermediate vector; and reconstructing the current block based on the one of the chain-based MV and the chain-based MVP.

2. The method of claim 1, wherein the current reference picture information of the current block indicates one or more reference pictures of the current block, and the determining whether the current intermediate vector is valid includes determining that the current intermediate vector is valid when the first reference picture indicated by the first reference picture information is one of the one or more of the reference pictures of the current block.

3. The method of claim 1, wherein the determining whether the current intermediate vector is valid comprises:

determining that the current intermediate vector is valid when an inter prediction direction indicated by the first reference picture information is the same as an inter prediction direction for the derivation of the at least one previously derived intermediate vector indicated by the history information.

4. The method of claim 1, wherein the determining whether the current intermediate vector is valid comprises:

determining that the current intermediate vector is valid when an absolute difference between a picture order count (POC) of the first reference picture indicated by the first reference picture information and a POC of the current picture is smaller than or equal to a predefined number.

5. The method of claim 1, wherein consecutive intermediate vectors derived in a traverse order for the one of the chain-based MV and the chain-based MVP for the current block include the current intermediate vector and one or more of the at least one previously derived intermediate vector, the traverse order is from a first intermediate vector to a last intermediate vector in the consecutive intermediate vectors, the last intermediate vector being the current intermediate vector, and the determining whether the current intermediate vector is valid includes determining that the current intermediate vector is not valid when the first intermediate vector points from the first block.

6. The method of claim 1, wherein the at least one previously derived intermediate vector includes at least one MV;

the method further includes determining a current linking size of the current intermediate vector based on a number of the at least one MV included in the at least one previously derived intermediate vector; and the determining whether the current intermediate vector is valid includes determining that the current intermediate vector is valid when the current linking size of the current intermediate vector is smaller than or equal to a predefined number.

7. The method of claim 1, wherein the determining whether the current intermediate vector is valid comprises:

determining that the current intermediate vector is valid when the position of the first block indicated by the current intermediate vector is within a predefined area.

8. The method of claim 1, wherein the current block is decoded using a merge mode;

the one of the chain-based MV and the chain-based MVP for the current block is the chain-based MV for the current block; and the reconstructing the current block includes reconstructing the current block based on the chain-based MV.

9. The method of claim 1, wherein the current block is decoded using an advanced MVP (AMVP) mode;

the one of the chain-based MV and the chain-based MVP for the current block is the chain-based MVP for the current block; and the reconstructing the current block includes:

constructing an MVP candidate list including the chain-based MVP for the AMVP mode; and reconstructing the current block based on (i) an MVP candidate from the MVP candidate list and (ii) an motion vector difference (MVD).

10. A method for video encoding, the method comprising:

determining whether a current intermediate vector pointing to a first block in a first reference picture from a second block in a second reference picture is valid for use in deriving one of a chain-based motion vector (MV) and a chain-based motion vector predictor (MVP) for a current block in a current picture based on one or more of (i) first reference picture information of the first reference picture, (ii) current reference picture information of the current block, (iii) a position of the first block, and (iv) history information associated with at least one previously derived intermediate vector that is associated with the current block in the current picture and the second block in the second reference picture;

when the current intermediate vector is determined to be valid, determining the one of the chain-based MV and the chain-based MVP for the current block based on the current intermediate vector and the at least one previously derived intermediate vector; and encoding the current block based on the one of the chain-based MV and the chain-based MVP using inter prediction, and encoding, in a video bitstream, coded information of the current block indicating that the current block is encoded using the inter prediction.

11. The method of claim 10, wherein the current reference picture information of the current block indicates one or more reference pictures of the current block, and the determining whether the current intermediate vector is valid includes determining that the current intermediate vector is valid when the first reference picture indicated by the first reference picture information is one of the one or more of the reference pictures of the current block.

12. The method of claim 10, wherein the determining whether the current intermediate vector is valid comprises determining that the current intermediate vector is valid when an inter prediction direction indicated by the first reference picture information is the same as an inter prediction direction for the derivation of the at least one previously derived intermediate vector indicated by the history information.

13. The method of claim 10, wherein the determining whether the current intermediate vector is valid comprises determining that the current intermediate vector is valid when an absolute difference between a picture order count (POC) of the first reference picture indicated by the first reference picture information and a POC of the current picture is smaller than or equal to a predefined number.

14. The method of claim 10, wherein consecutive intermediate vectors derived in a traverse order for the one of the chain-based MV and the chain-based MVP for the current block include the current intermediate vector and one or more of the at least one previously derived intermediate vector, the traverse order is from a first intermediate vector to a last intermediate vector in the consecutive intermediate vectors, the last intermediate vector being the current intermediate vector, and the determining whether the current intermediate vector is valid includes determining that the current intermediate vector is not valid when the first intermediate vector points from the first block.

15. The method of claim 10, wherein the at least one previously derived intermediate vector includes at least one MV;

the method further includes determining a current linking size of the current intermediate vector based on a number of the at least one MV included in the at least one previously derived intermediate vector; and the determining whether the current intermediate vector is valid includes determining that the current intermediate vector is valid when the current linking size of the current intermediate vector is smaller than or equal to a predefined number.

16. The method of claim 10, wherein the determining whether the current intermediate vector is valid comprises determining that the current intermediate vector is valid when the position of the first block indicated by the current intermediate vector is within a predefined area.

17. The method of claim 10, wherein the current block is encoded using a merge mode;

the one of the chain-based MV and the chain-based MVP for the current block is the chain-based MV for the current block; and the encoding the current block includes encoding the current block based on the chain-based MV.

18. The method of claim 10, wherein the current block is encoded using an advanced MVP (AMVP) mode;

the one of the chain-based MV and the chain-based MVP for the current block is the chain-based MVP for the current block; and the encoding the current block includes:

constructing an MVP candidate list including the chain-based MVP for the AMVP mode; and encoding the current block based on (i) an MVP candidate from the MVP candidate list and (ii) an motion vector difference (MVD).

19. A method of processing visual media data, the method comprising:

processing a video bitstream of the visual media data according to a format rule, wherein the bitstream includes coded information of a current block in a current picture indicating that the current block is decoded using inter prediction; and the format rule specifies that:

whether a current intermediate vector pointing to a first block in a first reference picture from a second block in a second reference picture is valid for use in deriving one of a chain-based motion vector (MV) and a chain-based motion vector predictor (MVP) for the current block is determined based on one or more of (i) first reference picture information of the first reference picture, (ii) current reference picture information of the current block, (iii) a position of the first block, and (iv) history information associated with at least one previously derived intermediate vector that is associated with the current block in the current picture and the second block in the second reference picture, and when the current intermediate vector is determined to be valid, the one of the chain-based MV and the chain-based MVP for the current block is determined based on the current intermediate vector and the at least one previously derived intermediate vector; and the current block is reconstructed based on the one of the chain-based MV and the chain-based MVP.

20. The method of claim 19, wherein the current reference picture information of the current block indicates one or more reference pictures of the current block, and the format rule specifies that the current intermediate vector is determined to be valid when the first reference picture indicated by the first reference picture information is one of the one or more of the reference pictures of the current block.

* * * * *